US009961566B2

(12) United States Patent
Lee et al.

(10) Patent No.: US 9,961,566 B2
(45) Date of Patent: May 1, 2018

(54) SCHEDULING METHOD AND APPARATUS FOR USE IN A COMMUNICATION SYSTEM

(71) Applicant: Samsung Electronics Co., Ltd., Gyeonggi-do (KR)

(72) Inventors: Intaek Lee, Gyeonggi-do (KR); Byoungha Yi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 14/046,295

(22) Filed: Oct. 4, 2013

(65) Prior Publication Data

US 2014/0106761 A1 Apr. 17, 2014

(30) Foreign Application Priority Data

Oct. 4, 2012 (KR) .......................... 10-2012-0110070

(51) Int. Cl.
*H04W 72/00* (2009.01)
*H04W 24/02* (2009.01)
*H04W 72/12* (2009.01)
*H04W 28/16* (2009.01)
*H04B 7/022* (2017.01)

(52) U.S. Cl.
CPC ........... *H04W 24/02* (2013.01); *H04W 28/16* (2013.01); *H04W 72/12* (2013.01); *H04B 7/022* (2013.01); *H04W 72/1226* (2013.01)

(58) Field of Classification Search
CPC . H04W 72/1289; H04W 64/00; H04W 72/04; H04W 28/16; H04W 16/14; H04W 24/02; H04W 72/12; H04W 72/1226; H04W 16/06; H04W 24/00; H04W 28/08; H04W 36/22; H04W 16/10; H04W 76/02; H04B 7/022
USPC ..... 455/450, 436, 67.1, 69, 556, 561, 452.2, 455/67.11, 453; 370/232, 233, 329, 395.4
See application file for complete search history.

(56) References Cited

U.S. PATENT DOCUMENTS

| | | | |
|---|---|---|---|
| 6,810,253 B2 * | 10/2004 | Lee et al. ...................... 455/436 |
| 8,463,313 B2 * | 6/2013 | Love et al. .................... 455/522 |
| 8,948,281 B2 * | 2/2015 | Kim .................. H04W 72/0426 370/330 |
| 2004/0185868 A1 * | 9/2004 | Jain ....................... H04W 52/12 455/453 |
| 2006/0121906 A1 * | 6/2006 | Stephens ............... H04W 16/18 455/446 |
| 2006/0166665 A1 * | 7/2006 | Shinoi ................... H04W 36/14 455/426.1 |
| 2007/0189261 A1 * | 8/2007 | Choi et al. ...................... 370/347 |
| 2009/0316811 A1 * | 12/2009 | Maeda et al. .................. 375/260 |

(Continued)

*Primary Examiner* — Golam Sorowar
*Assistant Examiner* — B. M. M Hannan
(74) *Attorney, Agent, or Firm* — The Farrell Law Firm, P.C.

(57) ABSTRACT

A method and apparatus for selecting a scheduling group of base stations is provided for use in a communication system. The method includes receiving, at the control apparatus, received signal power information for a signal received by a terminal; receiving cell edge terminal information on the terminal located at a cell edge; determining a combination of base stations that maximize throughput based on the received signal power information and the cell edge terminal information; and mapping the determined combination of the base stations to the integral scheduler.

14 Claims, 4 Drawing Sheets

(56) References Cited

U.S. PATENT DOCUMENTS

| | | | |
|---|---|---|---|
| 2010/0081448 A1* | 4/2010 | Wong | H04W 72/121 455/452.1 |
| 2010/0177725 A1* | 7/2010 | van Rensburg | 370/329 |
| 2010/0284345 A1* | 11/2010 | Rudrapatna | H04W 72/082 370/329 |
| 2010/0284346 A1* | 11/2010 | Rudrapatna | H04W 72/1247 370/329 |
| 2010/0309998 A1* | 12/2010 | Jung | H04B 7/024 375/260 |
| 2011/0034175 A1* | 2/2011 | Fong | H04B 7/024 455/450 |
| 2011/0039547 A1* | 2/2011 | van Rensburg et al. | 455/423 |
| 2011/0070918 A1* | 3/2011 | Hafeez | H04B 7/0452 455/522 |
| 2011/0077041 A1* | 3/2011 | Kwon | H04W 52/26 455/509 |
| 2011/0116476 A1* | 5/2011 | Lee et al. | 370/331 |
| 2011/0142164 A1* | 6/2011 | Wu | H04B 7/024 375/295 |
| 2011/0182375 A1* | 7/2011 | Kim | H04W 72/0426 375/260 |
| 2011/0287791 A1* | 11/2011 | Fujishima | H04B 7/061 455/500 |
| 2012/0020319 A1* | 1/2012 | Song | H04B 7/0632 370/330 |
| 2012/0046038 A1* | 2/2012 | Gao | H04W 28/16 455/447 |
| 2012/0082082 A1* | 4/2012 | Etemad | H04W 72/1215 370/312 |
| 2012/0157138 A1* | 6/2012 | Senda | H04J 11/0056 455/501 |
| 2012/0178462 A1* | 7/2012 | Kim | H04W 72/048 455/450 |
| 2012/0178484 A1* | 7/2012 | Liu | H04J 11/0053 455/513 |
| 2012/0327873 A1* | 12/2012 | Kim | H04L 5/0007 370/329 |
| 2013/0039326 A1* | 2/2013 | Kim | H04B 7/024 370/329 |
| 2013/0286997 A1* | 10/2013 | Davydov | H04B 7/024 370/329 |
| 2013/0315186 A1* | 11/2013 | Kim | H04W 72/0406 370/329 |
| 2014/0036822 A1* | 2/2014 | Maeda | H04W 72/04 370/329 |
| 2014/0050202 A1* | 2/2014 | Baligh | H04B 7/024 370/336 |
| 2014/0094169 A1* | 4/2014 | Takano | H04W 48/16 455/434 |
| 2014/0213315 A1* | 7/2014 | Kim | H04W 52/325 455/522 |

* cited by examiner

SCHEDULING METHOD AND APPARATUS FOR USE IN A COMMUNICATION SYSTEM

PRIORITY

This application claims priority under 35 U.S.C. § 119(a) to Korean Patent Application No. 10-2012-0110070, which was filed in the Korean Intellectual Property Office on Oct. 4, 2012, the content of which is incorporated herein by reference.

BACKGROUND

1. Field of the Invention

The present disclosure relates generally to a method and apparatus for selecting a group of base stations in a communication system, and in particular, to a method for selecting a group of base stations when installing a new base station or extending or optimizing a network in a wireless communication system operating with Remote Radio Heads (RRHs) deployed in a distributed manner on the network.

2. Description of the Related Art

Communication networks are designed to maximize system coverage and capacity efficiency with radio units installed in a distributed manner within a network installation space and using cooperative and integrative scheduling. Such network design policies alleviate coverage holes caused by geographical characteristics and other problems caused by legacy network designs with the addition of extra radio units.

Further, such network design policies may fulfill the intended throughput maximization only with the operation of a centralized integrated scheduler, which allocates radio resources in consideration of radio environments of the users connected through a plurality RRHs managed by the base station, other than allocating the resource to the users independently.

More specifically, RRHs may be used to transmit the same data to a user to obtain the diversity gain under the control of the centralized scheduler. Also, some users may be denied resource allocation in order to avoid interference for another user served by neighbor RRHs.

If it is determined that the users are far enough away to use the same resource without interfering with each other, the entire network throughput may be increased by allocating the same resource space to a plurality of users. Basically, the integrated scheduler makes a scheduling decision to maximize the Proportional Fairness (PF) of the entire network.

Using the integrated scheduler makes it possible to apply the PF scheduling technique, which is used for each base station to perform radio resource allocation within each cell in the legacy cellular system, to groups of cells, in order to integrally manage multiple cells to optimize the radio resource allocation performance for a plurality of cells under one scheduler, other than one cell.

However, the integrated scheduler is also restricted in the number of base stations that may be managed, by complexity and system load.

Accordingly, the entire network requires a plurality integrated schedulers, which increases the complexity on how to combine the base station for efficient management of the integrated scheduler to increase PF of the entire network.

The scheduling method of the legacy cellular system or distributed base station system performs scheduling to the user connected per cell independently.

Accordingly, the radio resource is allocated to maximize the PF per cell, and the adjacent cells avoid allocating the transmit power or resources at the same time in the inter-cell interference cancellation and Multi-User Multiple Input Multiple Output (MU-MIMO) techniques.

However, the above-described techniques attempt to maximize the throughput of the base station as the transmission source, and thus, if they are used along with the centralized scheduler, this may actually reduce system throughput.

SUMMARY

Accordingly, the present invention is designed to address at least the problems and/or disadvantages described above and to provide at least the advantages described below.

An aspect of the present invention is to provide a method for selecting a base station in order to increase PF of an entire system in an integral scheduling of a plurality of base stations.

Another aspect of the present disclosure is to provide a method for selecting a group of base stations in order to maximize PF of an entire network using an integral scheduler within a restricted number of base stations that can be handled by the integral scheduler.

In accordance with an aspect of the present disclosure, a method for a control apparatus to map a plurality of base stations to an integral scheduler in a communication system is provided. The method includes receiving, at the control apparatus, received signal power information for a signal received by a terminal; receiving cell edge terminal information on the terminal located at a cell edge; determining a combination of base stations that maximize throughput based on the received signal power information and the cell edge terminal information; and mapping the determined combination of the base stations to the integral scheduler.

In accordance with another aspect of the present disclosure, a control apparatus for mapping a plurality of base stations to an integral scheduler is provided. The apparatus includes a reception unit configured to receive received signal strength information provided by a terminal and to receive cell edge terminal information on the terminal located at a cell edge; and a control unit configured to determine a combination of base stations that maximize throughput based on the received signal power information and the cell edge terminal information, and to map the determined combination of the base stations to the integral scheduler.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Herein, the term "user" may be used interchangeably with the term "User Equipment (UE)," i.e., an apparatus that receives data from a base station.

Figure 1:
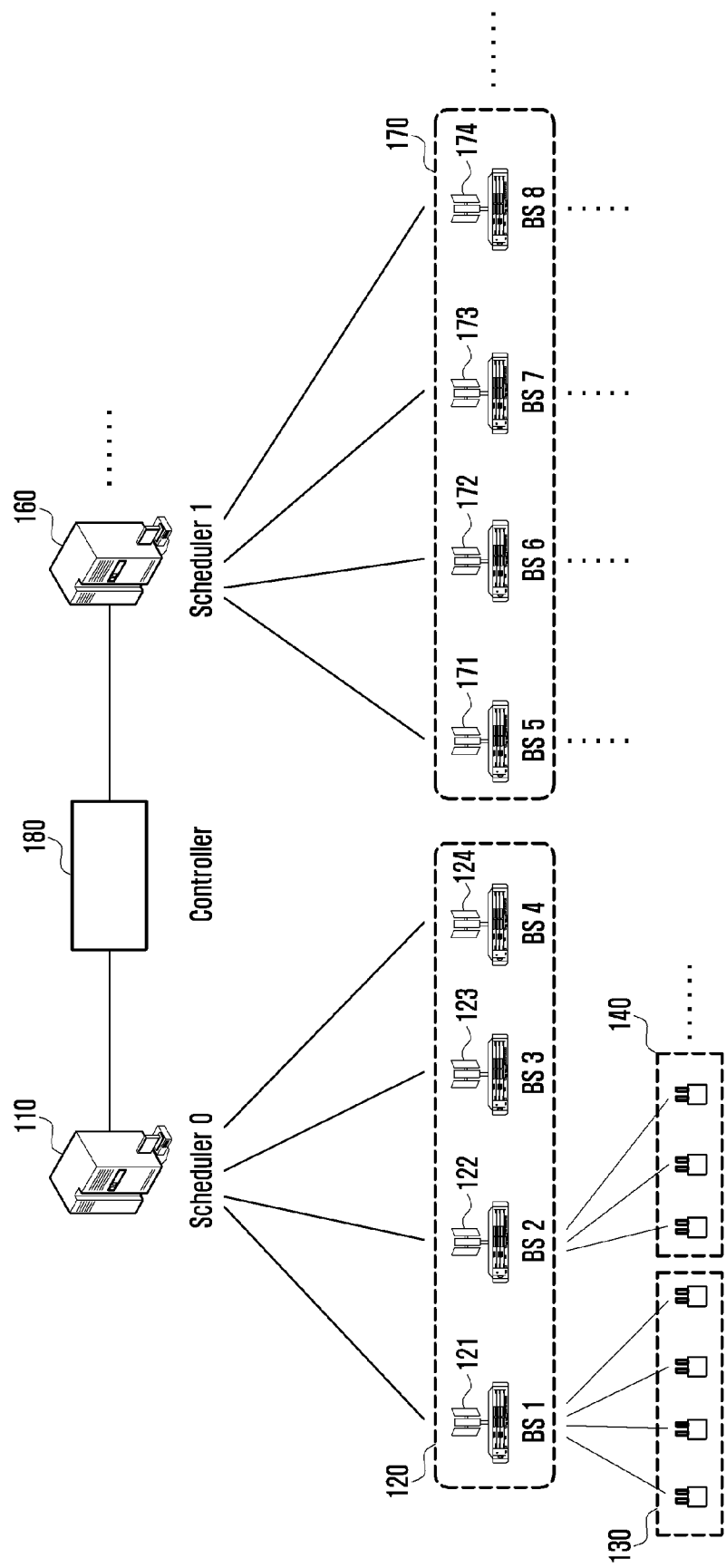
FIG. 1 illustrates communication network system according to an embodiment of the present invention.

FIG. 1 illustrates a communication network system according to an embodiment of the present invention.

Referring to FIG. 1, the communication network system includes integral schedulers 110 and 160, base station groups 120 and 170 including base stations (BS1 to BS8 121 to 124 and 171 to 174), which are scheduled by integral schedulers 110 and 160, respectively, and transceivers 130 and 140 connected to each base station for data communication.

Although not illustrated, each base station may be connected to a higher layer entity for communication. For example, each of the base stations may be connected to a Mobility Management Entity (MME) or a Serving Gateway (SGW).

Integral schedulers 110 and 160 perform scheduling for resource allocation when allocated base station groups 120 and 170 communicate with users. In FIG. 1, the integral scheduler 0 110 may perform scheduling for resource allocation of the first base station group 120, and the integral scheduler 1 160 may perform scheduling for resource allocation of the second base station group 170.

The integral schedulers 110 and 160 may perform resource allocation for cover the user served by the base stations 120 and 170 scheduled by the integral schedulers 110 and 160. More specifically, the base station to serve the user may be determined depending on the location of the user within the cells of the base stations 120 and 170, and for a cell edge user, the base stations may be allocated resources for transmitting the same data. This technique for a plurality of cells to transmit the same data to the cell edge user may be referred to as an aid technique, which will be described in more detail below.

The communication network system also includes a controller 180 for designating the base station groups 120 and 170 to be scheduled by the integral schedulers 110 and 160. The controller 180 may be implemented as a separate entity connected to integral schedulers 110 and 160, as illustrated in FIG. 1, or may be implemented as a part of each of the integral schedulers 110 and 160.

In FIG. 1, the controller 180 maps the integral scheduler 0 110 to the first to fourth base stations 121 to 124 and maps scheduler 1 160 to the fifth to eighth base stations 171 to 174. The controller 180 may change the base station group mapped to each integral scheduler based on the received signal strength reported by the users communicating with the base stations 120 and 170 or distribution of the aid-target users. For example, to maximize the PF of the entire communication system, the controller 180 may designate the integral scheduler 0 110 for scheduling of the first base station 121, the third base station 123, the fourth base station 124, and the sixth base station 172. The base station mapping method for maximizing PF of the communication system will be described in more detail below.

Additionally, the controller 180 may be connected to one or more integral schedulers and may include a transceiver for communicating data with the connected integral scheduler and a control unit for controlling the operation of the controller 180 based on the data received by the transceiver.

Figure 2:
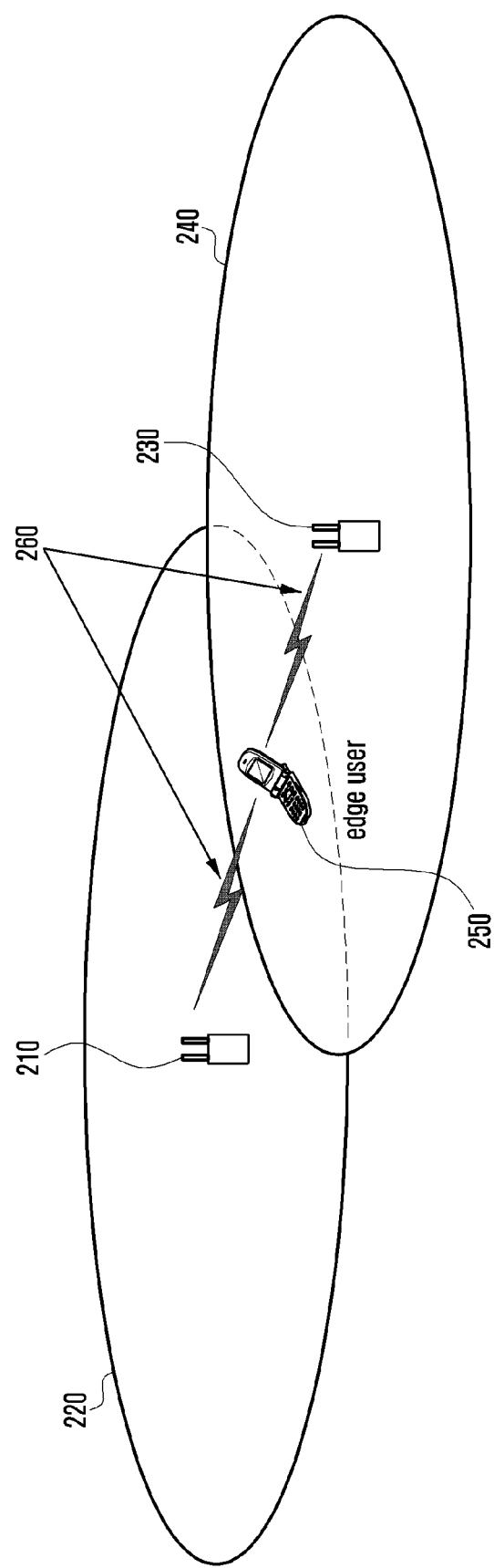
FIG. 2 illustrates an aid procedure of a transceiver for a user located at cell edges of a plurality of cells according to an embodiment of the present invention.

FIG. 2 illustrates an aid procedure of a transceiver for a user located at cell edges of a plurality of cells according to an embodiment of the present invention.

Referring to FIG. 2, a first transceiver 210 communicates with a user located within a first cell 220. The second transceiver 230 communicates with a user located within a second cell 240.

A user 250 is located in an overlapping area of the first and second cells 220 and 240. If the first and second transceivers 210 and 230 transmit the signals carrying different information on the same frequency band, communication efficiency may be degraded due to the interference therebetween. In this case, if the first and second transceiver 210 and 220 are scheduled to transmit the same signal, the user 250 may receive the signal without interference. By scheduling the same signal as denoted by reference number 260, it is possible to improve the communication efficiency of the user 250 at the cell edge area. Therefore, in order for the first and second transceivers 210 and 230 to transmit the same signal, the first and second transceivers 210 and 230 are controlled by the same integral scheduler. Techniques for transmitting the same data to a cell edge user using one or more transceivers are referred to herein as "an aid technique."

As described above, it is possible to improve PF of the entire system using the aid technique. However, because the number of base stations that the integral scheduler can schedule is limited due to the system complexity and load control issues, in accordance with an embodiment of the present invention, each integral scheduler is matched to a group of base station to improve the PF of the communication system. If the same integral scheduler schedules a plurality of cells in which a plurality of users are located, the PF is likely to be increased.

In a wireless communication system operating with RRHs distributed within the communication network, the following method may be used for maximizing PF by combining the scheduling result of the base stations with the integral scheduler.

$$\text{maximum proportional fairness} = \max\left(\sum_i throughput_i\right) \quad (1)$$

In Equation (1), i denotes an ith access point. By maximizing each access point, it is possible to maximize the PF.

The application of Equation (1) to the system according to an embodiment may be expressed as shown in Equation (2).

$$\text{total } PF = \sum_{i=1}^{N} \sum_{j=0}^{J_i} \sum_{m=0}^{M_{i,j}} \log(throughput_{i,j,m}) \quad (2)$$

In Equation (2), N denotes a number of base stations, J denotes a number of cells, and M denotes a number of users. Accordingly, maximizing Equation (2) will maximize the PF.

In a legacy wireless communication system that does not use an integral scheduler, throughput can be expressed as shown in Equation (3).

$$throughput_{i,j,m} = B \cdot \left( \frac{RxP_{i,j,m}}{\sum_{i'=0}^{N-1} \sum_{j'=0}^{J-1} RxP_{i',j',m} + N} \right) \cdot \log_2 \left( 1 + \frac{RxP_{i,j,m}}{\sum_{i'=0}^{N-1} \sum_{j'=0}^{J-1} RxP_{i',j',m} + N} \right) \quad (3)$$

In Equation (3), B denotes bandwidth allocation rate according to Signal to Interference-plus-Noise Ratio (SINR). RxPi,j,m denotes the received signal strength of an mth user in the jth cell of the ith base station. N denotes noise power.

When using an integral scheduler according to an embodiment of the present invention, it is possible to use an aid technique of transmitting the same data to a cell edge user through a plurality of cells, in order to increase PF of the cell. When applying the aid technique, the throughput may be expressed as shown in Equation (4).

$$throughput_{i,j,m} = B \cdot \left( \frac{RxP_{i,j,m} + RxP_{DomonantI_m,m}}{\sum_{\substack{i'=0 \\ i' \neq i \text{ or} \\ i',j' \neq DomonantI_m}}^{N-1} \sum_{\substack{j'=0 \\ j' \neq j}}^{J-1} RxP_{i',j',m} + N} \right) \cdot \log_2 \left( 1 + \frac{RxP_{i,j,m} + RxP_{DomonantI_m,m}}{\sum_{\substack{i'=0 \\ i' \neq i \\ i',j' \neq DomonantI_m}}^{N-1} \sum_{\substack{j'=0 \\ j' \neq j}}^{J_{i'}-1} RxP_{i',j',m} + N} \right) \quad (4)$$

In Equation (4), DominantIm denotes the base station and cell index performing the aid technique to the mth user.

By taking the aid-available rate in a cell, based on Equations (3) and (4), into consideration, it is possible to derive Equation (5), as shown below.

the scheduling pattern index, Np denotes a number of scheduling patterns, and DominantIp,m denotes the index of base station and cell performing the aid to the mth user in applying the pth scheduling pattern.

Assuming that the rate of the aid of the cell is fixed to a predetermined value in Equation (5) and that SINR does not influence the selection of a scheduling group without the aid, the function for maximizing the PF of the network in the communication system using the integral scheduler can be expressed as shown in Equation (6).

When the aid rate of the cell is fixed to a predetermined value, the predetermined value may be determined according to the communication environment dynamically. This may be called Objective Function for PM maximization of the network.

$$\text{Objective Function} = \sum_{i=1}^{N-1} \sum_{j=0}^{J_i-1} \sum_{m \in Z_{i,j}} \log \left( \sum_{p=0}^{N_p-1} \log \left( 1 + \frac{RxP_{i,j,m} + RxP_{DomonantI_{p,m},m}}{\sum_{\substack{i'=0 \\ i' \neq i \text{ or} \\ i',j' \neq DomonantI_{p,m}}}^{N-1} \sum_{\substack{j'=0 \\ j' \neq j}}^{J_{i'}-1} RxP_{i',j',m} + N} \right) \right) \quad (6)$$

Accordingly, it is possible to search for a base station combination maximizing Equation (6) and select the base station group to which the integral scheduler allocates scheduling, based on the base station combination. When the selected base station group is scheduled by the integral scheduler, the network throughput or PF is maximized.

$$\text{Total } PF = \sum_{i=c}^{N-1} \sum_{j=0}^{J_i-1} \left( \sum_{m \in Z_{i,j}} \log(1 - A_{i,j}) \cdot \left( \sum_{p=0}^{N_p-1} A_{DomonantI_{p,m}} \cdot B \left( \frac{\left(1 - \sum_{p=0}^{N_p-1} A_{DomonantI_{p,m}}\right) \cdot}{\sum_{\substack{i=0 \\ i \neq i \text{ or} \\ i',j' \neq DomonantI_{p,m}}}^{N-1} \sum_{\substack{j'=0 \\ j' \neq j}}^{J-1} RxP_{i',j',m} + N} + B \left( \frac{RxP_{i,j,m} + RxP_{DomonantI_{p,m},m}}{\sum_{\substack{i=0 \\ i \neq i \text{ or} \\ i',j' \neq DomonantI_{p,m}}}^{N_{cNB}-1} \sum_{\substack{j'=0 \\ j' \neq j}}^{J-1} RxP_{i',j',m} + N} \right) \right) \right) \cdot \left( \log_2\left(1 + \frac{RxP_{i,j,m}}{\sum_{i'=0}^{N-1}\sum_{j'=0}^{J_{i'}-1} RxP_{i',j',m} + N}\right) + \sum_{p=0}^{N_p-1} A_{DomonantI_{p,m}} \cdot \log_2\left(1 + \frac{RxP_{i,j,m} + RxP_{DomonantI_{p,m},m}}{\sum_{\substack{i=0 \\ i \neq i \text{ or} \\ i',j' \neq DomonantI_{p,m}}}^{N_{cNB}-1}\sum_{\substack{j'=0 \\ j' \neq j}}^{J-1} RxP_{i',j',m} + N}\right) \right) + \sum_{m \in Z_{i,j}} \log\left((1 - A_{i,j}) \cdot B\left(\frac{RxP_{i,j,m}}{\sum_{i'=0}^{N-1}\sum_{j'=0}^{J_{i'}-1} RxP_{i',j',m} + N}\right) \cdot \log_2\left(1 + \frac{RxP_{i,j,m}}{\sum_{i'=0}^{N-1}\sum_{j'=0}^{J_{i'}-1} RxP_{i',j',m} + N}\right) \right) \right) \quad (5)$$

Figure 3:
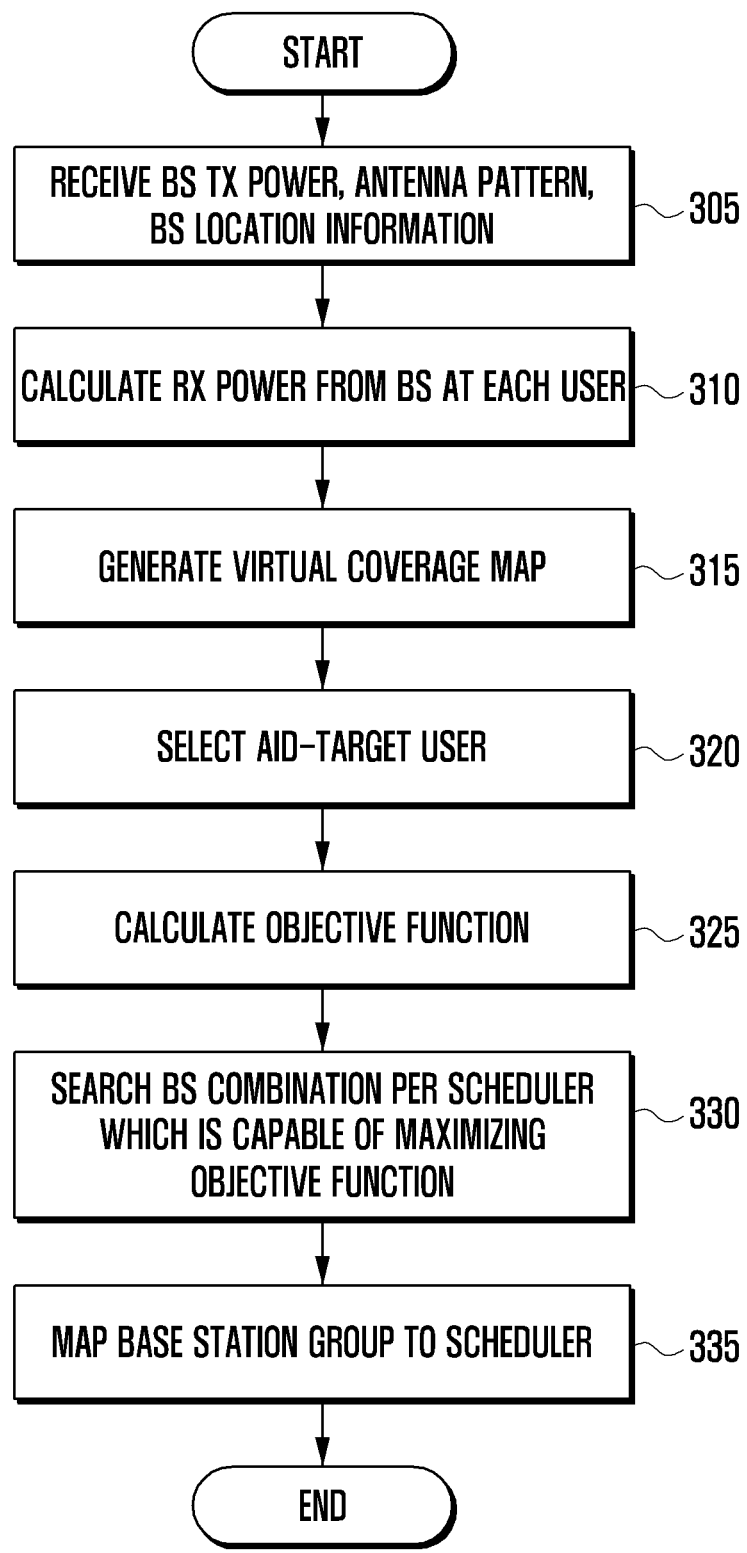
FIG. 3 is a flowchart illustrating a method for selecting a group of base stations designated for an integral scheduler in a communication system according to an embodiment of the present invention.

In Equation (5), Ai,j denotes the rate of aid of the jth cell of the ith base station, and Zi,j denotes a set of users as targets of aid of the jth cell of the ith base station. p denotes FIG. 3 is a flowchart illustrating a method for selecting a group of base stations designated for an integral scheduler in a communication system according to an embodiment of the present invention. Specifically, the method for selecting the base station group of the integral scheduler may be applied in an initial or extra deployment of base stations or when initially configuring the base station group of the integral scheduler.

At this time, the deployment of the base station is not determined yet and the aid-target users and user's receipt signal power measurement as the components of Equation (6) are not available yet. In an embodiment, it is possible to derive the objective function of Equation (6) using the basic information including a predicted transmit power of the base station, antenna gain, and location information. The Object Function may be derived by the controller or the integral scheduler of FIG. 1. The description is made under the assumption that the objective function is derived by the controller.

Referring to FIG. 3, the controller receives at least one of transmit (Tx) power of the base station to be deployed, an antenna pattern, and base station location information in step 305. For example, the base station location information may include the location information of the base stations that are already deployed, i.e., not the base stations to be deployed additionally.

In step 310, the controller calculates the received signal power from the base station, at the user connected to each base station, based on the information received in step 305.

In step 315, the controller generates a virtual coverage map based on the calculated received signal power. The controller may determine the communication environment when deploying the base station based on the virtual coverage map.

In step 320, the controller selects the aid-target user located at the cell edge of each cell based on the virtual coverage map.

In step 325, the controller calculates the objective function of Equation (6) using the calculated received signal power and aid-target user information.

In step 330, the controller determines the combination of base stations per scheduler that maximize the objective function, according to the selected base station group. For example, the number and combination of base stations to be mapped to each integral scheduler may be determined in determining a combination of groups.

In step 335, the controller maps the base station combination that maximizes the objective function to each integral scheduler, thereby improving throughput of the communication system.

Figure 4:
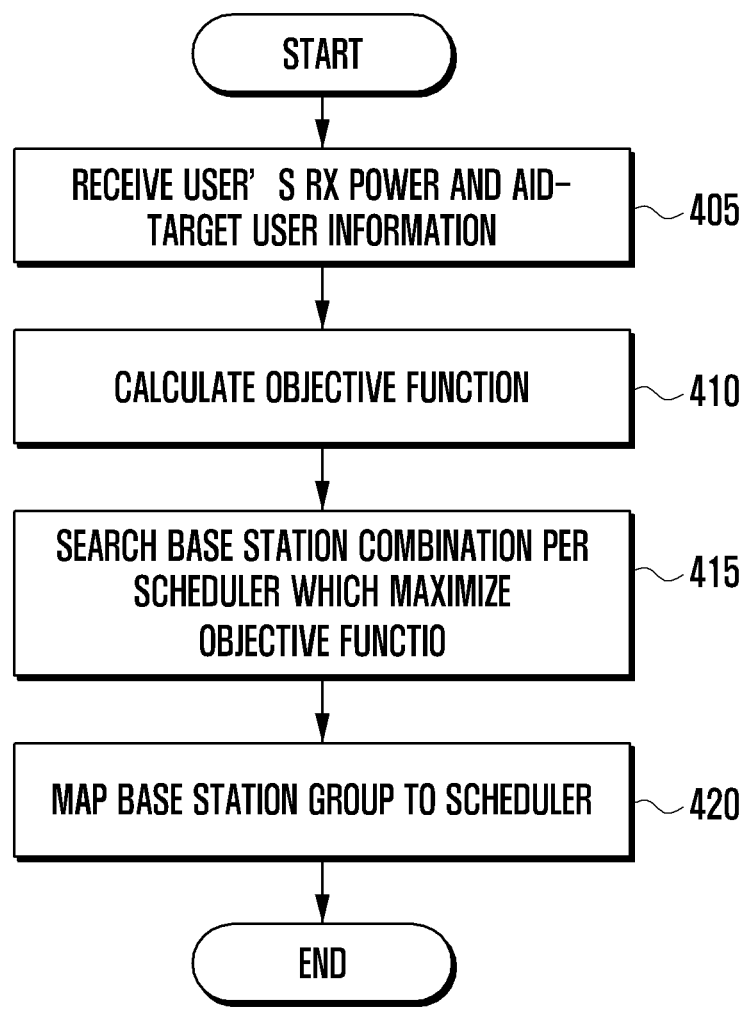
FIG. 4 is a flowchart illustrating a method for selecting a group of base stations designated for an integral scheduler in a communication system according to another embodiment of the present invention.

FIG. 4 is a flowchart illustrating a method for selecting a group of base stations designated for an integral scheduler in a communication system according to another embodiment of the present disclosure.

Referring to FIG. 4, in step 405, the controller receives received signal power and aid-target user information that are transmitted from a base station to a user. For example, the information is measured by the base station and may be derived from the information that the user connected to each base station periodically reports to the base station.

In step 410, the controller calculates the objective function based on the received information. The objective function is a formula for maximizing the entire throughput of the communication system and may be calculated based on Equation (6), as described above.

In step 415, the controller determines a combination of base stations for each scheduler, which maximize the objective function. For example, the number and combination of the base stations mapped to the integral controller may be determined based on the combination of the group.

In step 420, the controller maps the combination of the base stations, which maximizes the objective function to the corresponding integral controller, thereby improving the entire throughput of the communication system.

The procedure of searching for the combination of base stations to improve the entire throughput of the system by calculating the objective function may be performed until a specific condition is fulfilled, based on the received signal power and aid-target user information. For example, when the drop of the entire system throughput is predicted based on the received information, the above-described base station group search and mapping procedures may be performed.

The above-described scheduling methods and apparatuses maximize PF of an entire network in a wireless communication system including a plurality of RRHs distributed in the network and using centralized integral schedulers by selecting a group of base stations to be mapped to each scheduler.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method by a control apparatus in a communication system, the method comprising:
    receiving information on a second type base station to be deployed;
    estimating virtual power information of at least one terminal based on the information on the second type base station, wherein the virtual power information indicates a calculated power of a signal received from a first type base station already deployed and a predicted power of a signal received from the second type base station to be deployed;
    identifying a virtual coverage map based on the estimated virtual power information;
    determining an area based on the virtual coverage map;
    receiving power information from a terminal included in the area, the power information being determined by the terminal;
    determining a plurality of base stations to maximize proportional fairness (PF) by using an objective function which is calculated based on noise power and the received power information; and
    mapping the determined plurality of base stations to a scheduler,
    wherein the determined plurality of base stations transmit a same signal to the terminal.

2. The method of claim 1, wherein receiving the power information comprises receiving, from a base station, the power information received from the terminal.

3. The method of claim 1,
    wherein the information on the second type base station includes at least one of a transmission power of the second type base station, an antenna gain of the second type base station, antenna pattern, and location information of the second type base station,
    wherein the virtual coverage map represents a communication environment when the second type base station is deployed, and
    wherein the virtual coverage map is identified based on the information on the base station including the at least one of the transmission power, the antenna gain, the antenna pattern, and the location information of the second type base station.

4. The method of claim 1, wherein determining the plurality of base stations comprises:
setting a rate of aid to be performed by a base station to the terminal located at the cell edge to a preconfigured value; and
determining one or more base stations among the plurality of the base stations that maximize throughput based on the set rate.

5. The method of claim 1, wherein the objective function is:

Objective Function =

$$\sum_{i=1}^{N-1} \sum_{j=0}^{J_i-1} \sum_{m \in Z_{i,j}} \log \left( \sum_{p=0}^{N_P-1} \log \left( 1 + \frac{RxP_{i,j,m} + RxP_{Domonantl_{p,m},m}}{\sum_{\substack{i'=0 \\ i' \neq i \text{ or } j' \neq j \\ i',j' \neq Domonantl_{p,m}}}^{N-1} \sum_{\substack{j'=0 \\ j' \neq j}}^{J_{i'}-1} RxP_{i',j',m} + N} \right) \right),$$

wherein N denotes noise power and $RxP_{i,j,m}$ denotes the power information of an $m^{th}$ user in a $j^{th}$ cell of an $i^{th}$ base station.

6. The method of claim 1, further comprising:
receiving information on the terminal; and
determining whether to search for the plurality of the base stations to be mapped to the scheduler, based on the power information and the information on the terminal.

7. The method of claim 6, wherein determining whether to search for the plurality of the base stations comprises:
calculating throughput of the communication system based on the power information and the information on the terminal; and
determining whether to search for the plurality of the base stations to be mapped to the scheduler, when the throughput is in a predetermined range.

8. A control apparatus in a communication system, the control apparatus comprising:
a transceiver configured to transmit and receive signals; and
a controller coupled with the transceiver and configured to:
control the transceiver to receive information on a second type base station to be deployed,
estimate virtual power information of at least one terminal based on the information on the second type base station, wherein the virtual power information indicates a calculated power of a signal received from a first type base station already deployed and a predicted power of a signal received from the second type base station to be deployed,
identify a virtual coverage map based on the estimated virtual power information,
determine an area based on the virtual coverage map,
control the transceiver to receive power information from a terminal included in the area, the power information being determined by the terminal,
determine a plurality of base stations to maximize proportional fairness (PF) by using an objective function which is calculated based on noise power and the received power information, and
map the determined plurality of base stations to a scheduler,
wherein the determined plurality of base stations transmit a same signal to the terminal.

9. The control apparatus of claim 8, wherein the controller is further configured to control the transceiver to receive, from a base station, the power information reported to the base station by the terminal.

10. The control apparatus of claim 8,
wherein the information on the second type base station includes at least one of a transmission power of the second type base station, an antenna gain of the second type base station, an antenna pattern, and location information of the second type base station,
wherein the virtual coverage map represents a communication environment when the second type base station is deployed, and
wherein the controller is configured to identify the virtual coverage map based on the information on the base station including the at least one of the transmission power, the antenna gain, the antenna pattern, and the location information of the base station.

11. The control apparatus of claim 8, wherein the controller is further configured to set a rate of aid to be performed by the base station to the terminal to a configured value and determine one or more base stations of the plurality of base stations that maximizes throughput based on the set rate.

12. The control apparatus of claim 8, wherein the objective function is:

Objective Function =

$$\sum_{i=1}^{N-1} \sum_{j=0}^{J_i-1} \sum_{m \in Z_{i,j}} \log \left( \sum_{p=0}^{N_P-1} \log \left( 1 + \frac{RxP_{i,j,m} + RxP_{Domonantl_{p,m},m}}{\sum_{\substack{i'=0 \\ i' \neq i \text{ or } j' \neq j \\ i',j' \neq Domonantl_{p,m}}}^{N-1} \sum_{\substack{j'=0 \\ j' \neq j}}^{J_{i'}-1} RxP_{i',j',m} + N} \right) \right),$$

wherein N denotes noise power and $RxP_{i,j,m}$ denotes the power information of an $m^{th}$ user in a $j^{th}$ cell of an $i^{th}$ base station.

13. The control apparatus of claim 8, wherein the controller is further configured to control the transceiver to receive information on the terminal and determine whether to search for the plurality of the base stations to be mapped to the scheduler based on the power information and the information on the terminal.

14. The control apparatus of claim 13, wherein the controller further configured to calculate throughput of the communication system based on the power information and the information on the terminal, and determine whether to search for the plurality of the base stations to be mapped to the scheduler, when the throughput is in a predetermined range.

* * * * *